United States Patent [19]

Schmugge

[11] 4,319,141
[45] Mar. 9, 1982

[54] TURBINE CONFIGURATIONS USING WIND AND SOLAR POWER

[76] Inventor: Frederick K. Schmugge, One Salem Rd., East Brunswick, N.J. 08816

[21] Appl. No.: 163,940

[22] Filed: Jun. 30, 1980

[51] Int. Cl.³ .............................................. F02C 1/04
[52] U.S. Cl. ...................................... 290/52; 60/398
[58] Field of Search .................. 290/52; 415/2, 2 A, 415/219 B; 126/417, 400, 429, 441; 60/641, 398, 146, 147, 26, 29

[56] References Cited

U.S. PATENT DOCUMENTS

| | | | |
|---|---|---|---|
| Re. 30,136 | 11/1979 | Schriefer, Jr. | 126/441 |
| 129,567 | 7/1872 | Jones | 415/DIG. 8 |
| 695,525 | 3/1902 | Wuest | 160/247 |
| 1,939,317 | 12/1933 | Pope | 415/147 |
| 3,048,006 | 12/1960 | Goodman | 290/55 |
| 3,484,617 | 12/1969 | Winsel | 290/44 |
| 3,514,942 | 6/1970 | Kyryluk | 60/461.15 |
| 3,720,840 | 3/1973 | Gregg | 546/266 |
| 3,936,652 | 2/1976 | Levine | 290/10 |
| 4,018,543 | 4/1977 | Carson et al. | 415/2 R |
| 4,031,173 | 6/1977 | Rogers | 260/124 |
| 4,088,266 | 5/1978 | Keyes | 237/1 A |
| 4,118,636 | 10/1978 | Christian | 290/510 |
| 4,122,675 | 10/1978 | Polyak | 60/398 |

FOREIGN PATENT DOCUMENTS 2402647  7/1975  Fed. Rep. of Germany ... 415/DIG. 8

Primary Examiner—J. D. Miller
Assistant Examiner—D. L. Rebsch
Attorney, Agent, or Firm—Wilson, Fraser, Barker & Clemens

[57] ABSTRACT

A power system comprises structures which capture wind and solar energy to drive turbines for generating power. The structures can assume different forms, some intended to operate only from wind power. All in common, however, have lower air intake means which can accept the wind from any direction, air passageways that conduct the air upward through turbines, and venturi-assisted upper air exhaust vents which discharge the air downwind. Structures intended to operate on solar power in addition to wind have generally transparent sun-facing outer surfaces to admit solar radiation into the air passageways, a heat absorbing and transferring means inside the air passageways, and sufficient height that the solar heated air will rise with adequate velocity to operate the turbines. The invention includes an air inlet louver configuration which permits free entry of normal winds, but restricts entry of winds that have excessive force.

2 Claims, 16 Drawing Figures

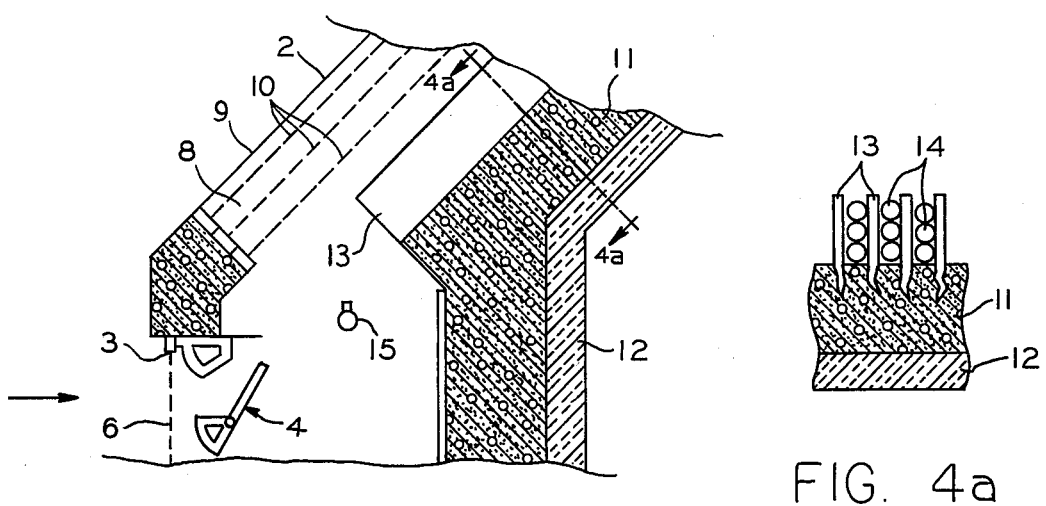
FIG. 4
FIG. 4a
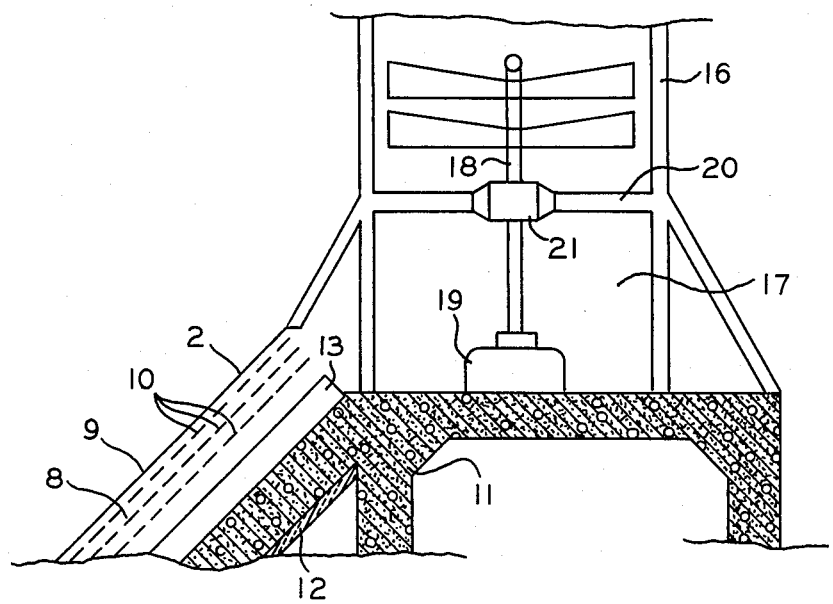
FIG. 5

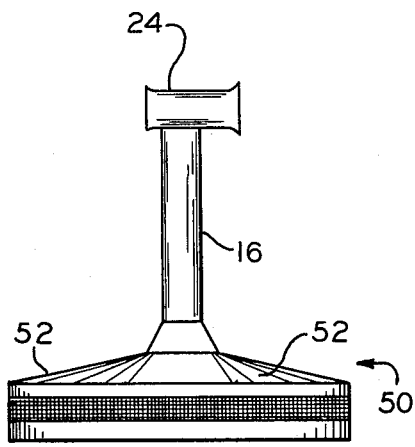
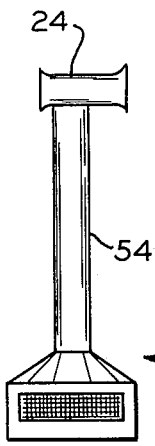
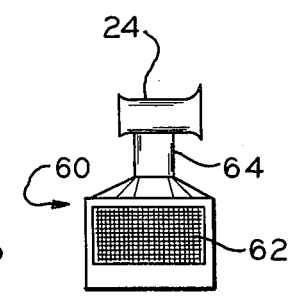
FIG. 12  FIG. 13  FIG. 14
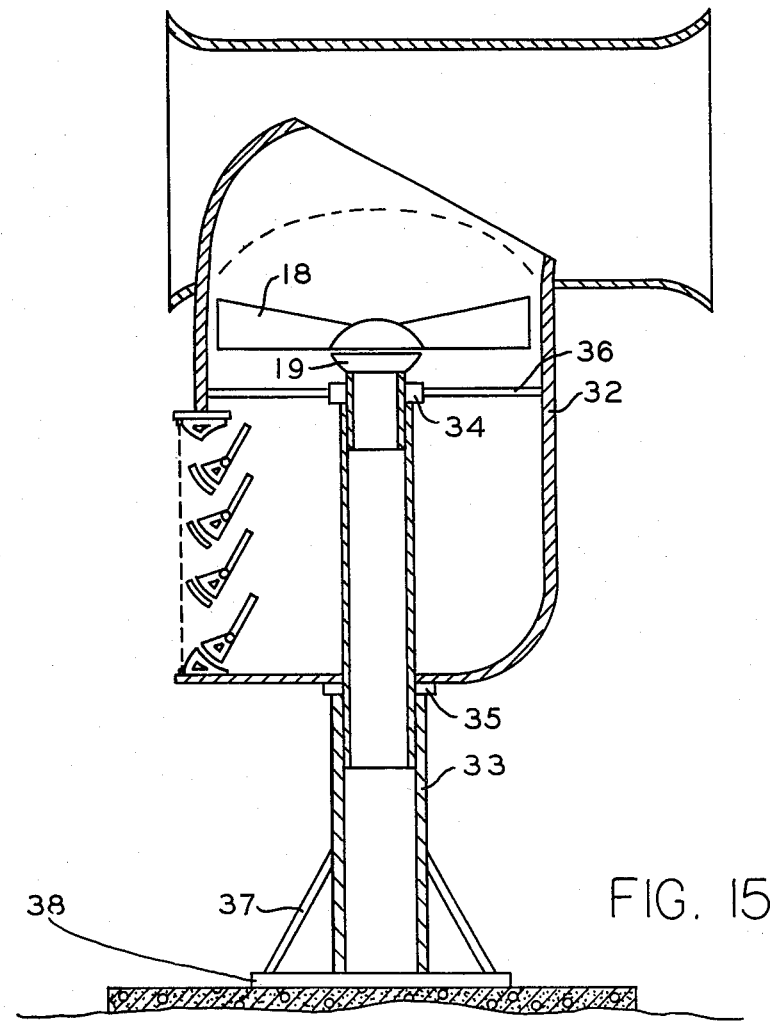
FIG. 15

TURBINE CONFIGURATIONS USING WIND AND SOLAR POWER

BACKGROUND OF THE INVENTION

1. Field of the Invention

Since other energy sources are limited in availability (example: fossil fuels and hydroelectric power) or produce pollution, (example: nuclear power and some fossil fuels), there is need for efficient, dependable means for using wind and solar power, both of which are plentiful and non-polluting. This invention combines both sources in one power generation system.

2. Description of the Prior Art

Several U.S. Patents, such as U.S. Pat. No. 695,524 and U.S. Pat. No. 3,936,652, describe propellors or turbines powered by heated air rising in a flue. Others, such as U.S. Pat. No. 3,514,942 and U.S. Pat. No. 4,118,636, describe turbines driven by solar heated air. U.S. Pat. No. 3,720,840 describes a ductwork through which wind is carried to a turbine, and in which the output can be supplemented by heating the air in the exhaust stack. Some, such as U.S. Pat. No. 4,018,543, describe devices operated only by wind, in which the air is carried by ductwork to the turbine.

This invention uniquely and significantly goes beyond these, and provides a system combining both wind and solar energy to provide power without polluting the environment.

SUMMARY OF THE INVENTION

The invention includes a lower air inlet means which can accept air from the direction of the wind, means for directing the passage of air upward through a windmill or turbine mounted on a vertical axis, and upper air exhaust means which discharge the air downward. In most cases, it also includes means for solar heating the air, and has sufficient height to cause the heated air to rise upward with considerable velocity. In its full and exemplary form, this invention is embodied by a commercial power plant, operating from both wind and solar energy. It comprises a large structure in which much of the interior space may be put to other uses, such as offices, department store, apartments, etc. Some of the interior space could be used for hydrogen and oxygen storage tanks, as described later; but external storage of these gases would be preferable in most cases, for safety considerations.

The lower area of the structure contains air inlets on all sides, so as to permit the wind to enter from any direction.

The sun-facing side of the structure is slanted for maximum exposure to the sun, depending on the latitude of its location. The exterior of this sun-facing side comprises air passageways for solar heating of the air. These are glazed with a generally transparent material to permit entry of solar radiation. The interior of these air passageways contains a means for absorbing the solar heat and transferring it to the air, such as several separated layers of black-painted metal screen. The east and west sides of the structure, which are generally vertical, may also have such solar heating air passageways in order to utilize radiation from the early morning and late afternoon sun. Air from the inlets is brought by ductwork to these solar heating air passageways, where it moves upward. This upward air movement may be due to the outside wind pressure, or to the rising of the expanding heated air, or to both effects combined.

At the top of the structure, the air is ducted to one or more cylindrical exhaust towers or stacks. These each contain an electric generator connected to a turbine operated by the moving mass of air. These stacks may be short, of sufficient length only to house the turbines; or they may be quite tall, to increase the velocity of the rising heated air. If tall, they may be equipped for additional solar heating of the rising air. In such case, their exterior skin will consist of generally transparent material, and their interior will contain heat transfer means, such as concentric cylinders or black-painted metal screen.

At the top of each tower or stack is a venturi-assisted air exhaust device, which swivels to discharge the air downward, and which reduces pressure at the top of the stack, thus increasing the upward air velocity through the stack.

To prevent turbine damage due to excessive velocity in very strong winds, the air inlets have a louver configuration which restricts the air inlet openings when the air velocity is high.

The solar heating air passageways on the main structure may be constructed to store some of the solar heat and release it later to cooler air. This tends to minimize output fluctuations due to passing clouds.

Unneeded electric power may be used to separate water into its hydrogen and oxygen components. The hydrogen will be burned to provide heated air for operation of the turbines whenever solar and wind power are insufficient. The oxygen and any surplus hydrogen will be sold commercially.

This total system provides an efficient, dependable, non-polluting power source.

Differing configurations will adapt this system to different locations, such as equatorial areas where the sun passes somewhat directly overhead, or off-shore locations where the structure may be floating or constructed on stilts or pilings. The system may also be added to existing buildings, in which case the structure configuration will be determined largely by the characteristics of each particular building. Structures built for lesser needs might omit some of the features of the system. For example, an individual farm home might have a small configuration using only wind power.

BRIEF DESCRIPTION OF THE DRAWINGS

The above objects and advantages of the invention will become readily apparent to one skilled in the art from reading the following detailed description of an embodiment of the invention when considered in light of the accompanying drawings, in which:

FIG. 4 is a sectional view illustrating a solar heated air passageway;

FIG. 4a is a sectional view taken on the plane 4a—4a of FIG. 4 illustrating heat absorption means;

FIG. 5 is a sectional view illustrating a typical construction of the upper air passageway, the air plenum and turbine;

FIG. 12 is an elevational view of a power plant structure embodying the invention, suitable for tropical latitudes;

FIG. 13 is an elevational view of an alternative structure in which solar heating is accomplished only in a transparent stack;

FIG. 14 is an elevational view of a power plant structure utilizing only wind power; and, FIG. 15 is an sectional view of an alternate configuration which drives a turbine by wind power only.

DESCRIPTION OF THE PREFERRED EMBODIMENT

Figure 1:
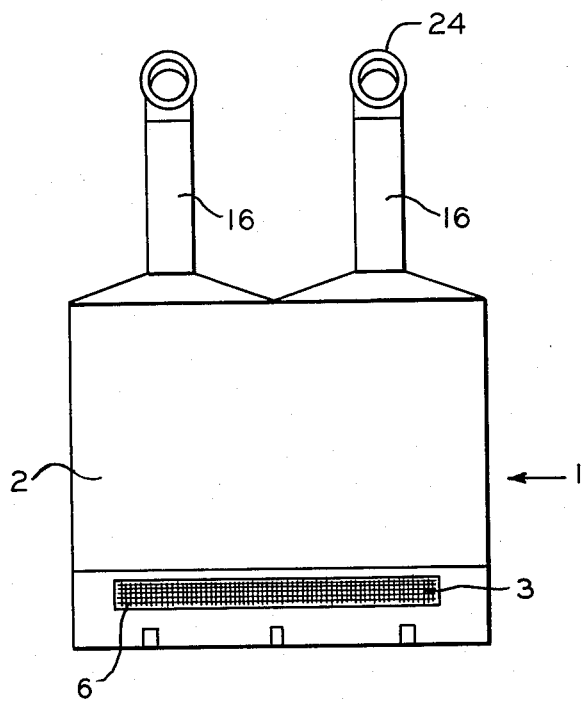
FIG. 1 is a front elevational view of a power plant structure embodying the invention.
Figure 2:
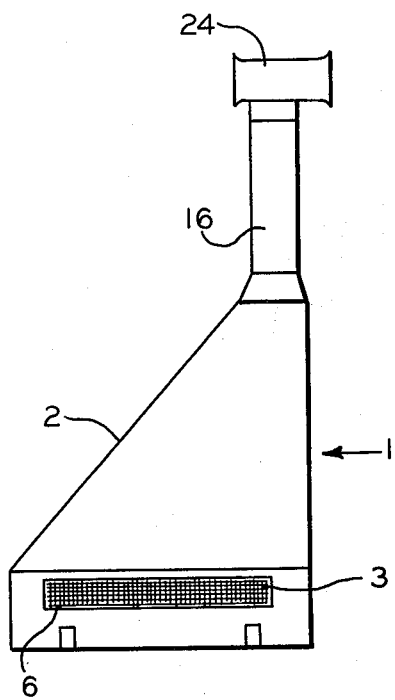
FIG. 2 is a side elevational view of the structure illustrated in FIG. 1.

An exemplary full implementation of this invention comprises a large building structure 1 having a transparent, inclined, solar facing wall 2 which encloses air passageways 8. Air flow is through inlets 3, through passageways 8, through a plenum 17, past a wind turbine 18, and through an exhaust stack 16. The entire structure 1, therefore comprises a means for channeling wind and solar heated air through a turbine. Most of the interior of the structure 1 may be used for such other purposes as providing office space.

Figure 3:
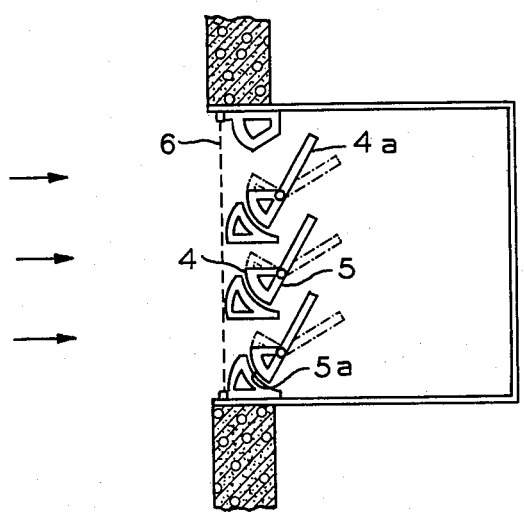
FIG. 3 is a sectional view showing in detail the construction of typical inlet louvers.

Screened air inlets 3 are located on the sides of the structure 1, and are preferably of equal area on each side of the structure 1. The inlets 3 are covered by protective screens 6. Although these air inlets 3 could have louvers which are operated electrically to open according to the sensed wind direction, and to partially close if the wind velocity is excessive, this invention includes a self-operating configuration of louvers 4, as illustrated in cross section in FIG. 3. The louvers 4 are pivotally mounted. Counterweights 5 at the bottom of the louvers 4 normally hold louver vanes 4a in a vertical position closing the inlets 3. Positive pressure in the ductwork also tends to hold the louvers 4 closed on all except the windward side. Either a positive outside pressure from the wind, or a negative inside pressure caused by rising heated air, pivots the louver vanes 4a open, as shown by solid lines in FIG. 3, to permit air to enter. Strong winds, which could cause excessive turbine velocity, pivot the louver vanes 4a so that lower surfaces 5a of counterweights 5 begin to close off the openings and restrict the air flow, as shown in dotted lines in FIG. 3.

FIG. 4 shows a cross sectional view through the lower portion of the solar heating air passageways 8. The solar heating air passageways 8 may be spaced so as to allow for windows or skylights between them, or may be intermixed with other solar panels which could provide heating for the structure's interior. Glazing 9, of a generally transparent material, forms the outer wall of the passage 8, and permits solar radiation to enter. Several separated layers of black-painted metal screen 10 are positioned within the passageways 8 to absorb solar radiation and transfer it to the air. Structural concrete or other structural material forms the inside wall 11 of passageway 8. If concrete is used behind the solar heating air passageways 8, a layer of insulation 12 insulates the concrete wall 11 from the structure's interior allowing the wall 11 to store solar heat for release later to cooler air. A plurality of black-painted metal fins 13 project from the wall 11 to facilitate transfer of heat to the concrete. They may be imbedded into the concrete, as shown in FIG. 4A, and may also enclose containers of eutectic salts 14 for additional and more efficient heat storage. Dividing walls between the solar heating air passageways, which provide the support for the glazing and the metal screens, are not shown. A gas burning orifice 15 is provided at the bottom of the passage 8 to heat the air for operation of the system when solar and wind power are insufficient.

FIG. 5 shows a vertical cross sectional view of the base of a cylindrical exhaust stack 16 and shows a practical arrangement of the turbine 18 and an electric generator 19. However, it is not intended to rule out other arrangements, nor is it intended to restrict use of the turbine output only to generation of electricity. At the base of the stack 16 is a plenum space 17 by which the rising air from all solar heating air passageways 8 is carried to the turbine 18 in the exhaust stack 16. Structural webbing 20 supports a turbine shaft bearing 21.

Figure 6:
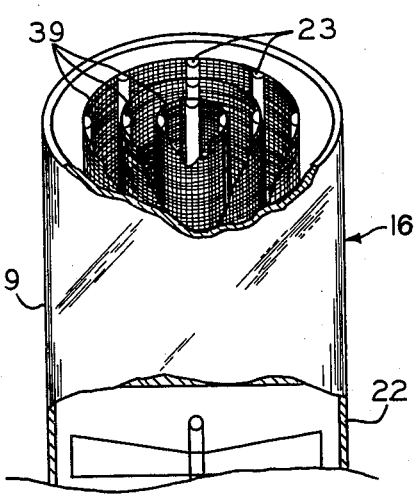
FIG. 6 is a sectional view of an exhaust stack, illustrating additional heat absorption means.

FIG. 6 shows a vertical cross sectional view of a tall exhaust stack 16 equipped for additional heating of the rising air. Stack 16 comprises a cylindrical framework 22 covered by transparent glazing 9. The interior has additional frame members 23 which support concentric cylinders of black-painted screen 39 for solar heat absorbtion and transfer thereof to the air.

Figure 7:
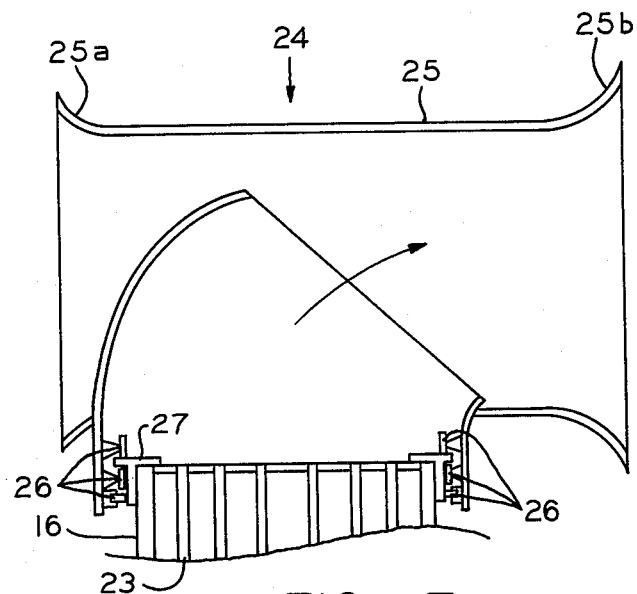
FIG. 7 is a sectional view of a venturi exhaust tube mounted on an exhaust stack.

FIG. 7 shows a cross sectional view of the exhaust vent 24 at the top of the stack 16. Although other air exhaust vent devices are available and could be used in this application, the preferred embodiment includes a venturi-assisted vent 24 which will create a substantially lower pressure to increase the flow of air through the turbine 18. A generally cylindrical shroud 25 having a restricted central section acts as a wind vane to turn the vent assembly so the air is always discharged downwind. It also acts as a venturi tube, in that the air moving through the restricted section reduces air pressure at the top of the stack 16. The front 25a of the shroud 25 may be slightly belled to increase the volume of air blowing through the shroud 25; the rear 25b may be belled even more to increase the wind vane characteristics. The usefulness of such a venturi-assisted exhaust vent 25 should not be considered as restricted to these turbine devices, but will have other uses, such as ventilating barns and attics, etc. The configuration of the exhaust vent 24 shown in FIG. 7 has a plurality of guide wheels 26 running on a circular T-beam track 27 at the top of the stack 16. Guide wheels 26 anchor the exhaust vent 24 firmly, but permit it to rotate freely with the wind. Other bearing means could be used. For example, a small attic ventilator might have only a nylon ring as a bearing surface.

A comprehensive energy storage system includes a separate structure containing equipment for separating water into hydrogen and oxygen, and tanks for storing these two gases. In this way, unneeded electric power may be stored. Burning the hydrogen through the gas burning orifice 15 permits turbine operation when wind and solar power are insufficient. In emergencies, natural gas could be burned.

Figure 8:
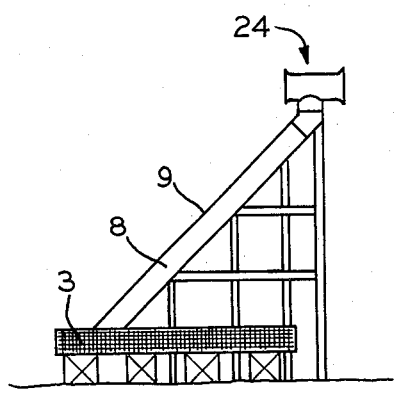
FIG. 8 is a side elevational view of an alternative structure for a power plant embodying the invention.
Figure 9:
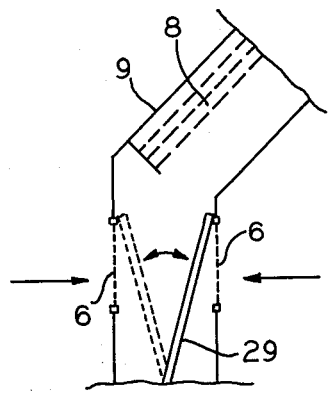
FIG. 9 is a schematic sectional view of air inlet means for controlling the direction of inlet air.

Thus far, the fullest implementation of the invention has been described. Some capabilities may be omitted. Also, as said earlier, the design of the structures may take many forms. In FIG. 8 is illustrated an embodiment of the invention for use where an enclosed structure is not desired. If located in an area where the winds are predominantly north and south, the side air intakes 3 may be omitted. In this case, and if other provision is made to prevent turbine damage from excessive winds (for example, feathering the turbine blades), the air intake configuration can be very simple, as illustrated in FIG. 9. A panel 29, hinged at the bottom, flops from one screened air inlet 6 to the other according to wind direction, sealing the downwind inlet to prevent the wind from blowing straight through.

Figure 10:
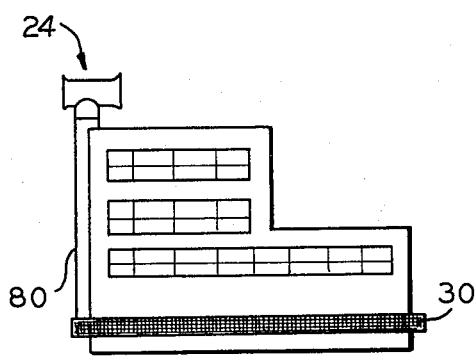
FIG. 10 is a side elevational view of a building structure retrofitted to embody the concepts of the invention.

FIG. 10 pictures a possible adaptation of this invention to an existing building. An air inlet ductwork 30 is attached to the lower area of the building, to carry air from any direction to the solar heating air passageways 80 attached to the sunfacing side of the building.

Figure 11:
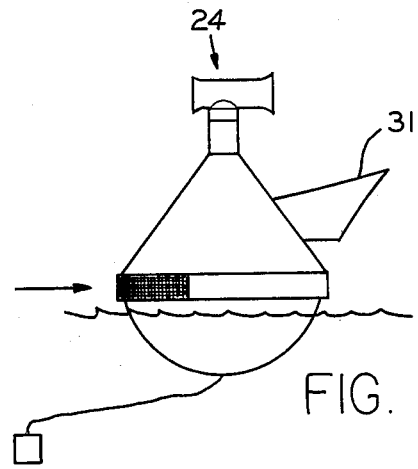
FIG. 11 is a side elevational view of a floatable structure embodying the invention.

A very efficient site for locating the power plants embodying this invention is off-shore where wind and sun are unhampered. Structures as already described can be built on stilts or pilings. Or they could be built as large floating structures, as in FIG. 11, which could be towed to off-shore locations and anchored wherever needed. The floating structure has a generally conical configuration, shaped somewhat like an upside down funnel. Its windvane 31 always keeps its air inlet pointed into the wind. The hydrogen and oxygen generation and storage facilities for such off-shore applications would be enclosed within the structure.

In equatorial areas, where the sun passes more nearly directly overhead, solar heating air passageways should be more nearly horizontal. A preferred embodiment of the invention for these regions is illustrated in FIG. 12. The structure 50 for such regions has a generally transparent top wall 52 of shallow conical configuration, the surface of which is inclined at a small angle to horizontal. The wall 52 composes the outside wall of the solar heating air passageways, as already described. The structures of the stack 16 and exhaust vent 24 are also as described for the embodiment illustrated in FIG. 1.

A further embodiment, suitable for limited space installation is illustrated in FIG. 13. In this embodiment solar heating is accomplished only in the transparent stack 54. The bottom 56 of the structure, not being provided with solar heating air passageways, is of a compact configuration. Other features of the invention, in particular the venturi exhaust vent 24, are as already described.

If only wind power is desired to drive a turbine, the invention may be embodied in the structure 60 illustrated in FIG. 14. This structure has relatively tall air inlets 62, and a relatively short exhaust stack 64, which may also have a venturi-assisted vent 24. The structure 60 utilizes the air inlet 62, a turbine on a vertical axis, an exhaust stack, and other features as previously described, but does not have solar heating means.

FIG. 15 shows still another configuration intended for only wind operation. It, too, utilizes a lower air inlet, upward passage of air through a turbine, and an upper air exhaust, which are typical of this invention, but does not provide for heating of the air. The entire housing 32 is supported on a central column 33 by means of upper and lower bearings 34 and 35 which allow the housing 32 to rotate freely with the wind. A plurality of radial arms support the upper bearing 34. The electric generator 19 and its driving turbine 18 are mounted at the top of the central support column 33. A reinforcing web 37 helps to secure the central column 33 to the bottom mounting plate 38, which is fastened to a concrete base or otherwise secured. Although an electric generator is preferred to produce usable energy output, it should be understood that the turbine output could be used for other purposes also, such as operation of a water pump by means of a shaft extending down the central support column.

In accordance with the provisions of the patent statutes, the principle and mode of operation of the apparatus have been explained and what is considered to represent its best embodiment has been illustrated and described. It should, however, be understood that the invention may be practiced otherwise than as specifically illustrated and described, without departing from its spirit or scope.

What is claimed is:

1. A power system for channeling wind and solar heated air to drive a turbine, comprising: air inlets; means for selectively opening said air inlets in an upward direction; means responsive to wind in excess of a predetermined velocity for partially closing said inlets; means for absorbing solar radiation and for heating collected air by conduction; passageway means for collecting inlet air and channeling it into contact with said air heating means, said passageway means including a transparent extended surface portion adapted to normally face the sun and an opaque extended surface radiation absorbing portion opposite the transparent surface; an air exhaust stack spaced above said passageway means, said exhaust stack having a cross-sectional area generally normal to the direction of air flow substantially less than the cross-sectional area of said passageway means generally normal to the direction of air flow, whereby air velocity within said stack is increased; an air plenum between said passageway means and said exhaust stack arranged to collect and channel rising air into said stack; and an air powered turbine between said passageway means and the top of said exhaust stack.

2. A power system for channeling wind and solar heated air to drive a turbine, comprising: air inlets; pivotally mounted louver vanes and counterweights attached thereto for selectively opening said inlets toward an upwind direction, said louver vanes extending upwardly from the pivot point of said louver vanes, and said counterweights depending from said pivot point, including secondary vanes below the pivot point arranged to partially close said inlets when high winds cause said louvers and counterweights to pivot beyond a preselected angle; means for absorbing solar radiation and for heating collected air by conduction; passageway means for collecing inlet air and channeling it into contact with said air heating means, said passageway means including a transparent extended surface portion adapted to normally face the sun and an opaque extended surface radiation absorbing portion opposite the transparent surface; an air exhaust stack spaced above said passageway means, said exhaust stack having a cross-sectional area generally normal to the direction of air flow substantially less than the cross-sectional area of said passageway means generally normal to the direction of air flow, whereby air velocity within said stack is increased; an air plenum between said passageway means and said exhaust stack arranged to collect and channel rising air in said stack; and an air powered turbine between said passageway means and the top of said exhaust stack.

* * * * *

UNITED STATES PATENT AND TRADEMARK OFFICE
CERTIFICATE OF CORRECTION

PATENT NO. : 4,319,141
DATED : March 9, 1982
INVENTOR(S) : Frederick K. Schmugge It is certified that error appears in the above-identified patent and that said Letters Patent are hereby corrected as shown below:

Column 1, line 37, "downward" should read --downwind--.

Column 2, line 13, "or" should read --of--, and line 17 "downward" should read --downwind--.

Signed and Sealed this

Eighth Day of June 1982

|SEAL|

Attest:

GERALD J. MOSSINGHOFF

Attesting Officer
Commissioner of Patents and Trademarks